United States Patent Office 3,471,549
Patented Oct. 7, 1969

3,471,549
PROCESS FOR THE PREPARATION OF PURE ARYL ESTERS OF DI- AND POLYCARBOXYLIC ACIDS
Hans-Leo Hülsmann, Witten-Rudinghausen, and Gustav Renckhoff, Witten (Ruhr), Germany, assignors to Chemische Werke Witten G.m.b.H., Witten (Ruhr), Germany
No Drawing. Filed Aug. 5, 1964, Ser. No. 387,788
Claims priority, application Germany, Aug. 10, 1963, C 30,667
Int. Cl. C07c 67/00
U.S. Cl. 260—475                                    16 Claims

ABSTRACT OF THE DISCLOSURE

Process for the preparation of aryl esters of aromatic and aliphatic polycarboxylic acids, the carboxylic acid groups of the aromatic acids being meta- or para-positioned with respect to each other, which comprises heating an alkyl ester of a polycarboxylic acid with a phenolic compound in the presence of an effective ester radical interchange catalyst, for example, butyl titanate, to above 160° C., separating a calculated amount of the alkanol formed in the reaction from the reaction mixture, adding a lower fatty acid anhydride to the reaction mixture in a molar amount at least equivalent to the amount necessary to react with the remaining unreacted alkyl ester groups, and separating the resultant lower fatty acid alkyl ester from the reaction mixture. The process is particularly applicable to the preparation of aryl esters of iso- and terephthalic acids, giving yields in excess of 90%.

---

This invention relates to the preparation of aryl esters of di- and polycarboxylic acids. More particularly, it relates to a process for the preparation of aryl esters of carbocyclic aromatic and aliphatic or alicyclic di- and polycarboxylic acids. Even more particularly, the invention relates to the preparation of aryl esters of the above-named acids whose carboxyl groups are not ortho to each other.

It has already been proposed to prepare aryl esters of carbocyclic aromatic and aliphatic or alicyclic mono- and polycarboxylic acids by heating the methyl esters of these acids with monohydric phenols in the presence of ester radical interchange catalysts to temperatures above 160° C. and continuously removing the split-off methyl alcohol from the reaction mixture. The complete ester radical interchange of all the ester groups in di- or polycarboxylic acids to aryl esters is, however, rather lengthy and even after long reaction times, the reaction batches contain large proportions of mixed methyl aryl esters, in addition to the desired polyaryl esters, so that a fractional distillation or crystallization of the reaction products is additionally required for recovering the pure di- and polyaryl esters.

One of the objects of the present invention is to provide an improved process for the preparation of aryl esters of di- and polycarboxylic acids which overcomes the disadvantages and deficiencies of the prior art methods.

Another object of the present invention is to provide a process for the preparation of aryl esters of di- and polycarboxylic acids which may be carried out in an efficacious and economical manner.

A further object of the present invention is to provide a process that yields pure aryl esters of di- and polycarboxylic acids.

A still further object of the present invention is to provide a process for the preparation of aryl esters of di- and polycarboxylic acids which may be carried out easily and simply.

These and other objects of the present invention will become apparent to those skilled in the art from a reading of the following specification and claims.

In accordance with the present invention, it has been found that pure aryl esters of di- or polycarboxylic acids may be easily obtained by heating the alkyl esters of alkanols containing 1 to 6 carbon atoms and aliphatic, alicyclic or aromatic di-or polycarboxylic acids, except those aromatic acids with ortho-positioned carboxyl groups, with at least equivalent amounts of monohydric phenols and/or naphthols and/or phenols or naphthols which are substituted by alkyl and/or aralkyl groups in the presence of ester radical interchange catalysts to temperatures above 160° C., while removing the alkanol freed in the reaction as rapidly as possible, by adding after the cleavage of about 50 to 65% of the amount of alkanol calculated for a complete ester radical interchange a quantity of a lower fatty acid anhydride at least equivalent to the amount necessary to react with the unreacted alkyl ester groups still present in the reaction mixture at that point, and terminating the reaction while removing as quickly as possible the alkyl ester of the lower fatty acid which has been formed.

The ester radical interchange catalysts that may be used in the present invention are those acid or alkaline substances known in the art as suitable for such purposes, for example, polyphosphoric acids, acidic alkali-phosphates, toluenesulfonic acids, alkali metal or alkaline earth metal hydroxides, tertiary amines, etc. Particularly advantageous as ester radical interchange catalysts are antimony compounds, metallic magnesium and aluminum, tin compounds, for example tin stearate, and titanic acid esters, for example butyl titanate, or mixtures of these substances. The catalysts are preferably used in amounts of from 0.1 to 5.0% by weight, based on the amount of alkyl ester employed. A combination of magnesium, tin stearate and butyl titanate has been found to be a particularly advantageous catalyst for the preparation of diaryl tere- and isophthalates.

The lower alkyl esters of aliphatic, alicyclic or aromatic di- and polycarboxylic acids having 1 to 6 carbon atoms in the alkyl ester groups, with the exception of the aromatic acids with ortho-positioned carboxyl groups, are used as starting materials in the process according to the present invention. Examples of such compounds include the methyl, ethyl, propyl, butyl, amyl, and hexyl esters of oxalic acid, succinic acid, sebacic acid, hexahydroterephthalic acid, isophthalic acid, terephthalic acid, chloroterephthalic acid, dichloroterephthalic acid, diphenyl dicarboxylic acids, diphenylmethane dicarboxylic acids, benzophenone dicarboxylic acids, trimesic acid, naphthalene dicarboxylic acids, etc. Isophthalic acid and terephthalic acid are particularly suitable in the method of the present invention.

As phenolic components to be used in the present invention, the monohydric phenols or naphthols can be mentioned, for example, phenol, the isomeric cresols or xylenols, butylphenols, octylphenols, benzylphenols, β-naphthol, etc. Instead of the pure phenols, it is also possible to employ technical isomeric mixtures. Mixed aryl esters are thereby obtained. Mixed aryl esters are of interest for some fields of application because of their relatively low melting point.

Generally, 1 mole of phenol is utilized for each alkyl ester group to be reacted. However, it often is of advantage to use a slight excess of up to 25% of the calculated amount of phenol so as to obtain a more rapid and more complete reaction.

The reaction is initially carried out preferably at a temperature of from 180° to about 250° C. The alkanol given off should be removed from the reaction mixture as rapidly as possible. If the thermal stability of the reactants allows it, the reaction temperature used may be higher still. Below 160° C., the reaction proceeds immeasurably slowly.

The reaction is generally carried out at atmospheric pressure. If low-boiling carboxylic acid esters are used as starting materials, it may possibly be necessary to work under excess pressure in order to obtain a reaction temperature which is within the range indicated. On the other hand, it may be advantageous, when using very high-boiling reaction components, to facilitate the removal of the cleaved-off alkanol by applying a vacuum to the reaction mixture.

If the speed of the reaction slows down after cleavage of about 50 to 75% of the amount of alkanol calculated for complete reaction, a quantity of a lower fatty acid anhydride is added. The amount added is determined mathematically and is that quantity sufficient to convert into aryl esters the amount of phenol stiochiometrically required at least for a quantitative reaction of the alkyl ester groups still present at that time.

The lower fatty acid anhydrides that may be used are, by way of example, acetic anhydride, propionic anhydride, and butyric anhydride. Acetic anhydride is the preferred lower fatty acid anhydride. Prior to the addition of the fatty acid anhydride, the reaction mixture is cooled to such an extent that the anhydride can react with the phenol still present in the reaction mixture to give formation of the aryl ester of the fatty acid. Thus, only the lower fatty acid is distilled off from the reaction mixture. The reaction temperature is subsequently increased such that the lower fatty acid and its alkyl ester distill off the reaction mixture, while the aryl ester of the fatty acid flows back into the reaction mixture. When the cleavage of the lower carboxylic acid and the alkyl ester thereof is completed, the excess amount of the aryl ester of the lower fatty acid is distilled off. The residue obtained is the uniform di- or polycarboxylic acid aryl ester. This product can be converted into the desired degree of purity by distillation or crystallization.

The di- and polycarboxylic acid aryl esters formed by the method herein possess technical importance as plasticizers and as intermediate products for organic syntheses. They are especially valuable as intermediates in the production of polycondensation products.

The following examples are given merely as illustrative of the present invention and are not to be construed as limiting.

EXAMPLE I 388 parts by weight of dimethyl terephthalate (2 moles) and 94 parts by weight of phenol (1 mole) are heated with stirring in a flask equipped with a fractionating column after addition of a mixture of 2 parts by weight each of metallic magnesium, tin stearate and butyl titanate as catalyst. A slow nitrogen stream is passed through the apparatus. As soon as the reaction mixture has reached a temperature of 232° C. and the cleavage of methanol commences vigorously, another 282 parts by weight of phenol is proportionately added through a heated dropping funnel. At this time, the temperature in the reaction flask stands at 230° to 250° C. 114 parts by volume of methanol splits off after 6 hours, which corresponds to 71% of the amount calculated for a complete reaction. After cooling of the contents of the flask to 180° C., another 47 parts by weight of phenol (0.5 mole) and 152 parts by weight of acetic anhydride (1.5 moles) are subsequently added dropwise over a period of one-half hour. While the sump temperature is constantly increased to 275° C., 199.5 parts by weight of a mixture of acetic acid and methyl acetate distills off within 1½ hours. The non-reacted phenol and phenyl acetate are separated by distillation and may be returned into a new reaction batch. The residual crude diphenyl terephthalate is purified by recrystallization from xylene with the addition thereto of active carbon and fullers earth. 598 parts by weight of pure diphenyl terephthalate is obtained in the form of shining colorless laminae which have a melting point of 198.5° C. The saponification number of the product is 353 (calculated as 353). The yield corresponds to 94% of the theoretical yield.

EXAMPLE II 388 parts by weight of dimethyl isophthalate (2 moles) and 94 parts by weight of phenol (1 mole) are brought to reaction, as described in Example I, after the addition of a mixture of 4 parts by weight of butyl titanate, 2 parts by weight of magnesium and 1 part by weight of tin stearate as catalyst. While methanol distills off at the top of the fractionating column, another 329 parts by weight of phenol (3.5 moles) is added dropwise at a flask temperature of between 220° to 236° C. 108 parts by volume of methanol splits off after 6 hours, which corresponds to 67% of the amount calculated for complete reaction. After cooling of the contents of the flask to 180° C., 184 parts by weight of acetic anhydride (1.8 moles) is subsequently added to the mixture over a period of 20 minutes. While the reaction temperature is continuously increased to 260° C., 223 parts by weight of a distillate distills off within 80 minutes. This distillate consists essentially of acetic acid and methyl acetate. The reaction product is then distilled under vacuum. 62 parts by weight of phenyl acetate passes over initially at a temperature of from 96° to 122° C. and at a pressure of 21 torr. Thereafter, 586 parts by weight of diphenyl isophthalate distills at 228° C. and 0.6 torr. This corresponds to 92% of the theoretical yield. The melting point of the diphenyl isophthalate product after recrystallization from xylene is 137° C., and the saponification number is 353 (calculated as 353).

The invention being thus described, it will be obvious that the same may be varied in many ways. Such variations are not to be regarded as a departure from the spirit and scope of the invention and all such modifications are intended to be included within the scope thereof.

We claim:

1. A process for the preparation of aryl esters of polycarboxylic acids which comprises heating an alkyl ester of a polycarboxylic acid selected from the group consisting of benzene dicarboxylic acids, the carboxyl groups of the aromatic acids being positioned other than ortho to each other and said alkyl ester containing 1 to 6 carbon atoms in the alkyl ester groups thereof, with a phenolic compound selected from the group consisting of phenol, naphthol and alkyl- and aralkyl-substituted phenols and naphthols, said phenolic compound being used in a molar amount at least equivalent to the number of alkyl ester groups contained in the alkyl ester, in the presenec of an effective ester radical interchange catalyst to temperatures above 160° C. while distilling the alkanol formed in the resultant ester radical interchange reaction as rapidly as possible, lowering the temperature of the reaction mixture after about 50 to 75% of the alkanol amount calculated for a complete ester radical interchange reaction has been removed, adding a lower fatty acid anhydride to the reaction mixture after the reaction temperature has been lowered sufficiently so that the anhydride can react with the phenolic compound still present to form the aryl ester of the fatty acid and only the fatty acid will be distilled off, the lower fatty acid anhydride being added in a sufficient quantity to convert into aryl esters the amount of phenol stiochiometrically required for at least a quanitative reaction of the alkyl ester groups present at that time, then increasing the reaction temperature such that the lower fatty acid and its alkyl ester distill off from the reaction mixture and such that the aryl ester of the fatty acid reacts with the remaining alkyl ester of the aromatic acid to complete the formation of the desired product, the excess aryl ester of the fatty acid being removed by distillation.

2. Process according to claim 1, wherein the polycarboxylic acid is isophthalic acid.

3. Process according to claim 1, wherein the polycarboxylic acid is terephthalic acid.

4. Process according to claim 1, wherein the alkyl ester is a methyl ester of said polycarboxylic acid.

5. Process according to claim 1, wherein the ester radical interchange catalyst is selected from the group consisting of antimony oxide, carboxylic acid esters of tin, alkyl esters of titanic acid, metallic magnesium, metallic aluminum, and mixtures thereof.

6. Process according to claim 5, wherein 0.1 to 5.0% by weight, based on the amount of alkyl ester, of the ester radical interchange catalyst is employed.

7. Process according to claim 5, wherein the alkyl ester is a methyl ester of said polycarboxylic acid.

8. Process according to claim 6, wherein the titanium alkyl ester is butyl titanate.

9. Process according to claim 1, wherein the lower fatty acid anhydride is acetic anhydride.

10. Process according to claim 1, wherein the alkyl ester is a methyl ester of said polycarboxylic acid and the lower fatty acid anhydride is acetic anhydride.

11. A process for the preparation of a diaryl ester of isophthalic acid which comprises heating the methyl ester of isophthalic acid with an at least equivalent amount of a phenolic compound selected from the group consisting of phenol, naphthol and alkyl- and aralkyl-substituted phenols and naphthols in the presence of a mixture of metallic magnesium, tin stearate and butyl titanate as the ester radical interchange catalyst to temperatures of from 190° to 250° C. while distilling the methnol formed in the resultant ester radical interchange reaction as rapidly as possible, lowering the temperature of the reaction mixture after about 50–75% of the methanol amount calculated for a complete ester radical interchange reaction has been removed, adding acetic anhydride to the reaction mixture after the reaction temperature has been lowered sufficiently so that the anhydride can react with the phenolic compound still present to form an aryl acetate and only acetic acid will be distilled off, the acetic anhydride being added in a sufficient quantity to convert into aryl esters the amount of phenol stoichiometrically required for at least a quantitative reaction of methyl ester groups present at that time, then increasing the reaction temperature such that acetic acid and methyl acetate distill off from the reaction mixture and such that the aryl ester of acetic acid reacts with the remaining methyl ester of isophthalic acid to complete the formation of the desired product, the excess aryl ester of acetic acid being removed by distillation.

12. Process according to claim 11, wherein 0.1 to 5.0% by weight, based on the amount of isophthalic acid methyl ester, of the ester radical interchange catalyst is employed.

13. Process according to claim 12, wherein said phenolic compound is phenol.

14. A process for the preparation of a diaryl ester of terephthalic acid which comprises heating the methyl ester of terephthalic acid with an at least equivalent amount of a phenolic compound selected from the group consisting of phenol, naphthol and alkyl- and aralkyl-substituted phenols and naphthols in the presence of a mixture of metallic magnesium, tin stearate and butyl titanate as the ester radical interchange catalyst to temperatures of from 190° to 250° C. while distilling the methanol formed in the resultant ester radical interchange reaction as rapidly as possible, lowering the temperature of the reaction mixture after about 50 to 75% of the methanol amount calculated for a complete ester radical interchange reaction has been removed, adding acetic anhydride to the reaction mixture after the reaction temperature has been lowered sufficiently so that the anhydride can react with the phenolic compound still present to form an aryl acetate and only acetic acid will be distilled off, the acetic anhydride being added in a sufficient quantity to convert into aryl esters the amount of phenol stoichiometrically required for at least a quantitative reaction of methyl ester groups present at that time, then increasing the reaction temperature such that acetic acid and methyl acetate distill off from the reaction mixture and such that the aryl ester of acetic acid reacts with the remaining methyl ester of terephthalic acid to complete the formation of the desired product, the excess aryl ester of acetic acid being removed by distillation.

15. Process according to claim 14 wherein 0.1 to 5.0% by weight, based on the amount of terephthalic acid methyl ester, of the ester radical interchange catalyst is employed.

16. Process according to claim 15, wherein said phenolic compound is phenol.

References Cited

UNITED STATES PATENTS 3,389,164   6/1968   Hulsmann et al. _____ 260—468

FOREIGN PATENTS 314,646   7/1929   Great Britain.

JAMES A. PATTEN, Primary Examiner

E. JANE SKELLY, Assistant Examiner

U.S. Cl. X.R.

260—468, 479